United States Patent [19]

Schick

[11] Patent Number: 5,095,590
[45] Date of Patent: Mar. 17, 1992

[54] CONVEYOR-BELT CLIP AND APPARATUS FOR APPLYING SAME

[75] Inventor: Jean-Francois Schick, Paris, France

[73] Assignee: Goro S.A., Chelles Cedex, France

[21] Appl. No.: 721,719

[22] Filed: Jun. 25, 1991

[30] Foreign Application Priority Data

Jun. 27, 1990 [FR] France .............................. 90 08079

[51] Int. Cl.$^5$ .............................................. F16G 3/02
[52] U.S. Cl. .................... 24/33 B; 24/33 R; 24/33 P; 198/844.2
[58] Field of Search ................ 24/33 B, 33 R, 33 F, 24/33 P, 33 L, 33 C, 31 H, 38; 198/728, 844.2; 474/257

[56] References Cited

U.S. PATENT DOCUMENTS

| 3,327,358 | 6/1967 | Schick | 24/33 B |
| 4,315,349 | 2/1982 | Stolz | 24/33 B |
| 4,653,156 | 3/1987 | Stolz et al. | 474/257 |
| 4,671,403 | 6/1987 | Schick | 24/33 B |
| 4,996,750 | 3/1991 | Musil | 24/33 B |

FOREIGN PATENT DOCUMENTS 1178076 5/1959 France ................ 24/33 B

Primary Examiner—Victor N. Sakran
Attorney, Agent, or Firm—Herbert Dubno

[57] ABSTRACT

Each belt connector or each clip is substantially so U-shaped as to be engaged with both sides of the corresponding edge of a conveyor belt (T) in order there to be secured by means of a U-shaped fixing staple or cramp of metal wire, whose arms are pressed through apertures in the bowed parts of each clip and through the strip between them. In the bowed part of each clip, to receive the staple ends, each aperture disposed opposite a tine of such a staple is connected, by way of a groove or channel or the like contrived in the outside surface of this same zone, to another aperture through which the corresponding tine can be led. The same can therefore be returned to inside the clip in order there to be pressed again into the conveyor belt or to engage between the same and the corresponding bowed part of the clip, something which occurs automatically when the staple ends are bent around and pressed against an anvil on which the clips are supported while the staples are driven in and secured in situ. These clips or belt connectors are of use for interconnecting two pieces of a conveyor belt.

10 Claims, 4 Drawing Sheets

CONVEYOR-BELT CLIP AND APPARATUS FOR APPLYING SAME

FIELD OF THE INVENTION

My invention relates to clips for use in interconnecting two pieces or portions of a conveyor belt. More particularly the invention relates to clips having a generally U-shaped cross-section and adapted to be secured to the ends of the two belt parts on both sides and then to be interconnected by a pivot pin which engages in the interdigitated hinge elements formed by the clips.

BACKGROUND OF THE INVENTION

In situ fixing of clips of this type is secured by means of U-shaped rivets or staples of metal wire, the two arms of the rivets or staples being pressed through apertures in a first bowed part of such a clip and then through the conveyor belt and then being led out through other apertures in the opposite bowed part of the clip. The staples are driven in by means of a drift which is applied consecutively to the top of each staple, the clips being supported during this step on a support member effective as an anvil. The support member is formed with grooves for receiving the staple tines in order to bend them round and press them onto the outside surface of the corresponding bowed part of the clips.

To ensure that the clips thus disposed are securely fixed in situ, drifting or machines have to be used which can provide very high pressures to produce the beaded connection between the staple tines and the clips. This calls for the use of relatively complex and costly machines.

OBJECTS OF THE INVENTION

It is therefore the principal object of this invention to provide improved connecting clips which can be fixed in place or without the need for a drifting machine of the kind referred to.

Another object is to provide an improved clip which will avoid the drawbacks of earlier systems.

Yet another object is to provide an improved apparatus for setting the clips of the invention.

SUMMARY OF THE INVENTION

To this end, in the bowed part of each clip according to the invention, the latter part being adapted to receive the ends of the fixing staples, each aperture disposed opposite a tine of such a staple is connected by a groove or channel or the like in the outside surface of the bowed part to another aperture through which the corresponding tine can be led in order to be returned into the clip interior in order to be pressed again into the conveyor belt or to engage between the same and the corresponding bowed part of the clip, a connection which is effected automatically when the staple ends are bent over and pressed on an anvil on which the clips are supported during the driving-in of the staples and during the securing thereof.

Since the staple tines are led back into the interior of the clips, the tines are locked instead of just remaining in the bent-round state on the outside surface of the corresponding bowed part of the clips. Consequently, the clips according to the invention, can be secured satisfactorily in situ without the staple tines having to be bent round at a very high pressure. A very simply constructed drifting device, which is also one of the features of the invention, can therefore be used.

Such device comprises a drift, which can be driven manually with the use of a hammer or similar tool, and a bar or rod or the like which is effective as an anvil and which serves to retain the clips during the fixing step. According to the invention, the bar is formed with a number of regularly spaced-apart protuberances which are also effective as means for locating the clips to be secured and are effective as consecutive seats adapted to receive a guiding hand tool comprising the drift for driving tin the fixing staples, the anvil bar or rod being formed with curved grooves in which the staple tines can be so bent round as to engage in the aperture adapted to receive the free tine ends.

According to another feature of the invention, the entry apertures and exit apertures in the bowed parts of the clips traversed by the bent parts of the staples can be so skewed or offset as not to be disposed on the same longitudinal line of the corresponding conveying belt. This ensures that weakened longitudinal lines, which may readily lead to the deterioration of the conveyor belt, are not produced therein.

According to another feature of the invention, the staple-end-receiving groove of channel or the like in the outside surface of the bowed part extends at a right angle to the connecting axis, so that the ends of the driven-in staples or the like are disposed on a single longitudinal line of the associated belt. The staple ends cannot therefore be exposed to, detaching forces when the belt runs over guiding and driving rollers or drums or the like.

More specifically, a clip for connecting two parts of a belt according to the invention can comprise:

a U-shaped clip body straddling a portion of the belt and having bowed parts lying along opposite sides of the portion, the clip body being formed with a pivot element adapted to interdigitate with pivot elements of another clip on another belt portion so that the pivot elements are connectable by a pin traversing the pivot elements, one of the bowed parts being formed with a pair of entry apertures, the other of the bowed parts being formed with a pair of exit apertures respectively aligned with the entry apertures, a respective re-entrant aperture associated with each of the exit apertures and a respective groove connecting each of the exit apertures and the respective re-entrant aperture; and a staple driven through the portion of the belt straddled by the U-shaped clip body and having a pair of tines connected by a connecting part lying along the one of the bowed parts, the tines traversing the pair of entry apertures, the portion of the belt and the exit apertures, and being bent to lie in the grooves and pass inwardly through the re-entrant apertures to terminate between the bowed parts within the clip body.

The apparatus or device for setting such clips can comprise:

a support bar forming an anvil and provided at regular intervals with a plurality of protuberances formed as means for locating the clips to be secured to the portion and with respective seats, and a manual guiding tool comprising a staple-driven drift engageable in the seats, the anvil being formed with curved grooves receiving the tines of the respective staples for automatically bending the tines to engage in the respective re-entrant apertures for receiving the tines between the bowed parts of the respective clip body.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
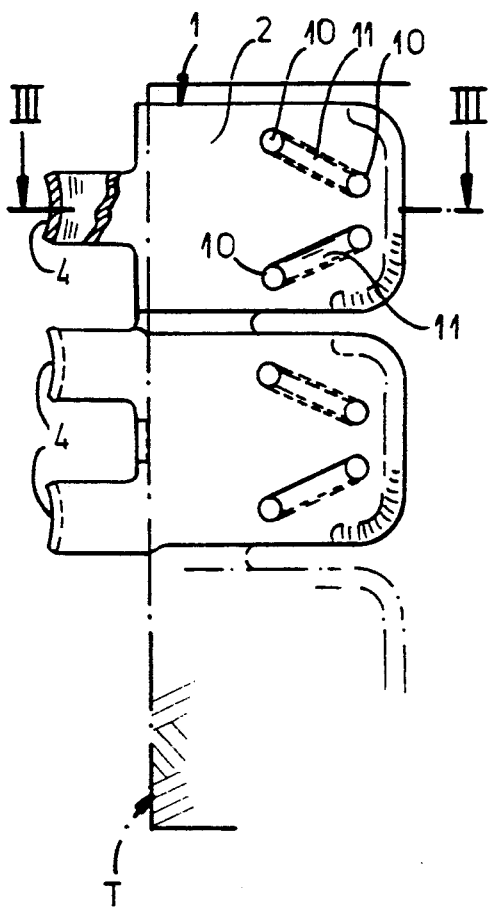
FIG. 1 is a partial plan view of a row of connecting clips according to the invention.
Figure 2:
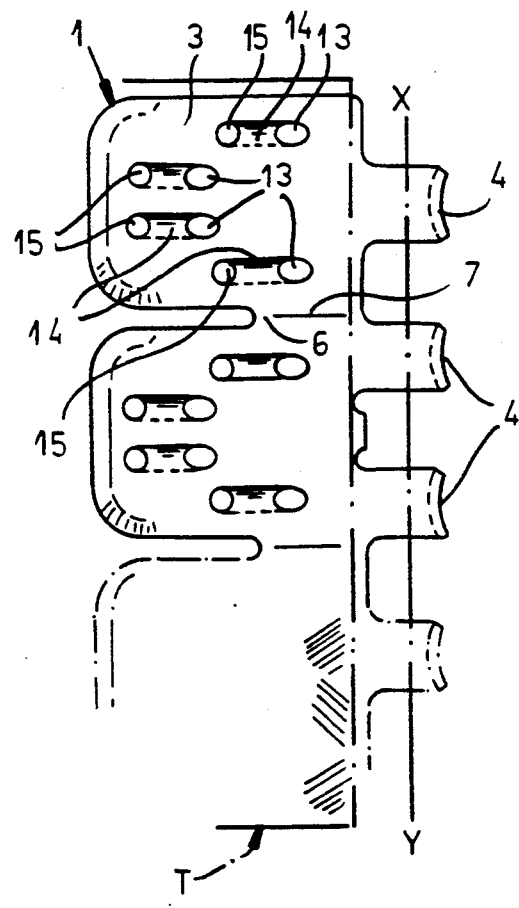
FIG. 2 is an inverted plan view.
Figure 3:
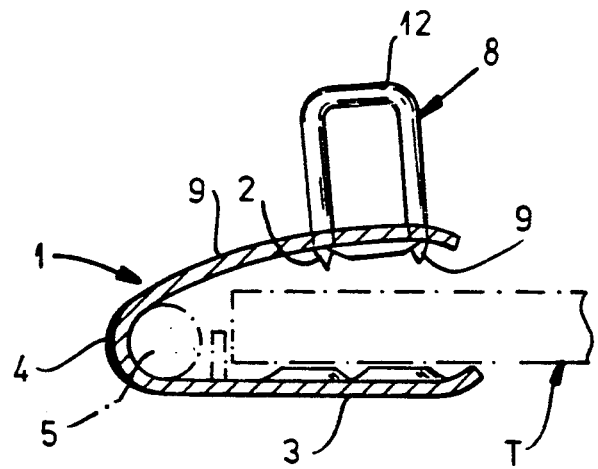
FIG. 3 is a cross-sectional view taken along the line III—III of FIG. 1.
Figure 4:
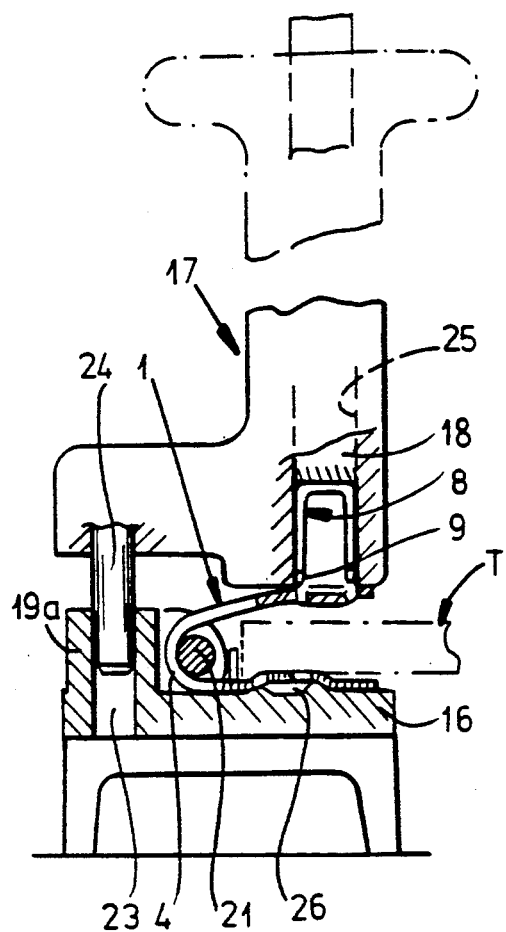
FIG. 4 a diagrammatic view in side elevation and cross section of the drifting device for setting the clips according to the invention.
Figure 5:
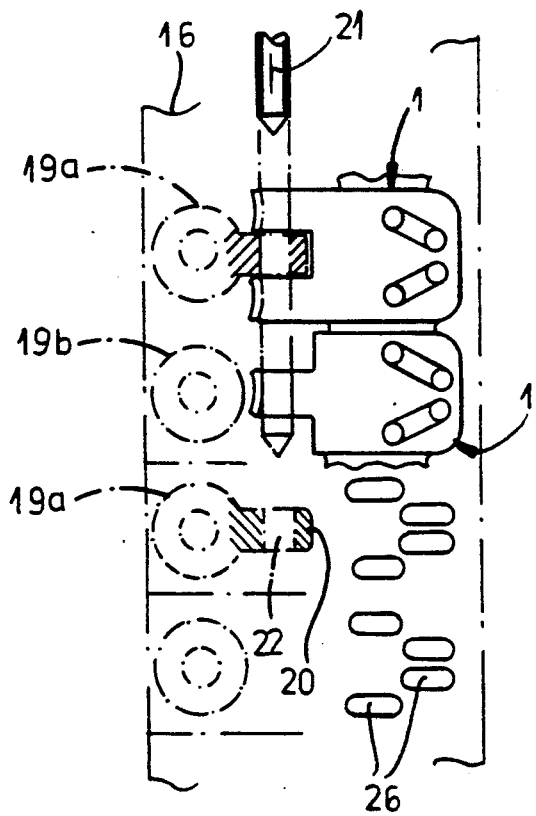
FIG. 5 a partial plan view of the rod or bar which is effective as an anvil and which is part of the drifting device.
Figure 6:
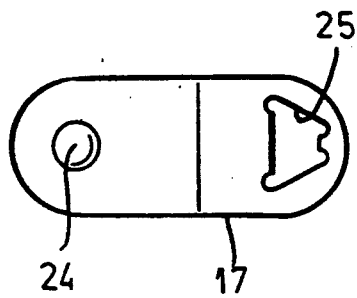
FIG. 6 is a plan view of the drift-guiding tool with the drift removed.

As already mentioned, FIG. 1 is a plan view and FIG. 2 an inverted plan view of a very small part of a row of clips 1 of the connection according to the invention. Each clip 1 is substantially U-shaped in cross section so that, as shown in FIG. 3, each clip can engage the end of a part or piece of a conveyor belt T on both sides.

Each clip 1 comprises two bowed parts 2, 3 which are disposed one above another and which, to simplify the description given hereinafter, will be called the "top bowed part" and "bottom bowed part." The curved part between the two bowed parts is so punched out that one or two hinge elements or bights 4 are formed in each clip.

Figure 9:
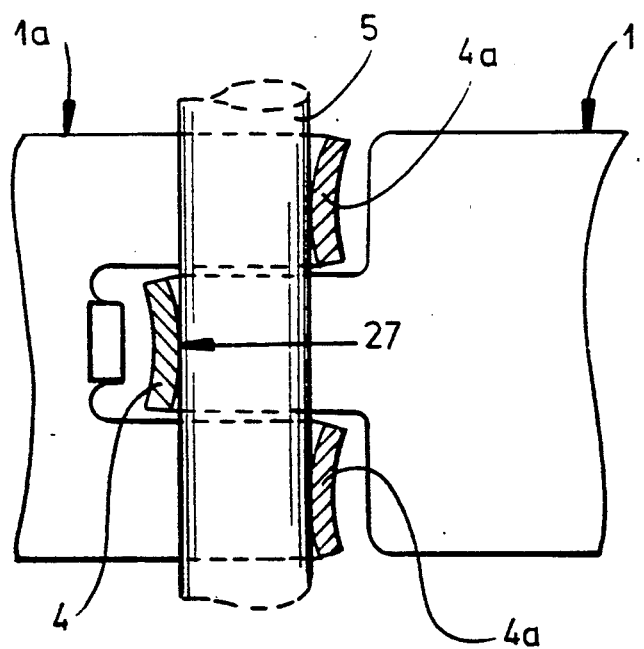
FIG. 9 a view in longitudinal section taken along the line IX—IX of FIG. 8 and shows the connection of two clips according to the invention in two opposite rows of such clips.

As can be gathered from FIGS. 1 and 2, the clips 1 or 1a of a given row have consecutive hinge elements. Consequently, two opposite rows of such clips can be joined together by making their hinge elements interdigitate and engaging a connecting and pivot or hinge pin in the passage which is formed when all the hinge elements are in alignment with one another (FIG. 9).

All the clips 1 of the same row are unitary elements produced from metal foil which is bent around itself and parted off appropriately. On one of the surfaces—the bottom surface in the present case—the clips of the same row are interconnected by a bridge-piece 6 (FIG. 2) formed with a relatively weak line 7 which will subsequently be broken. The various clips on the opposite side are, as FIG. 1 shows, completely independent of one another.

For subsequent fixing to a conveyor belt T, each of the clips 1 has two ready-to-use fixing staples 8 mounted thereon. Each staple 8 comprises a U-shaped metal wire whose tines 9 are pressed into the apertures 10 in the top bowed part 2 of each clip. In this position, therefore, the staples 8 project above the clips in the manner visible in FIG. 3.

The two entry apertures 10 for the tines of each staple 8 are skewed in order not to be disposed on the same horizontal line of the conveyor belt T. As FIG. 1 shows, the two corresponding aperture pairs 10 in the top bowed part 2 of each clip are arranged in a V. Also, the two apertures 10 of the same pair are interconnected by a hollow groove or channel 11 (or the like) with which the outside surface of the top bowed part 2 of the clips is formed and which is adapted to serve at least to some extent as a seat for the top part 12 of the corresponding staple 8.

The bottom bowed part 3 of each clip 1 is formed, opposite each entry aperture 10 in the top bowed part 2, with an exit aperture 13 of larger cross section than the entry aperture 10. The exit aperture 13 is adapted to receive the tine 9 of the staple 8 introduced into the opposite aperture 10.

Figure 8:
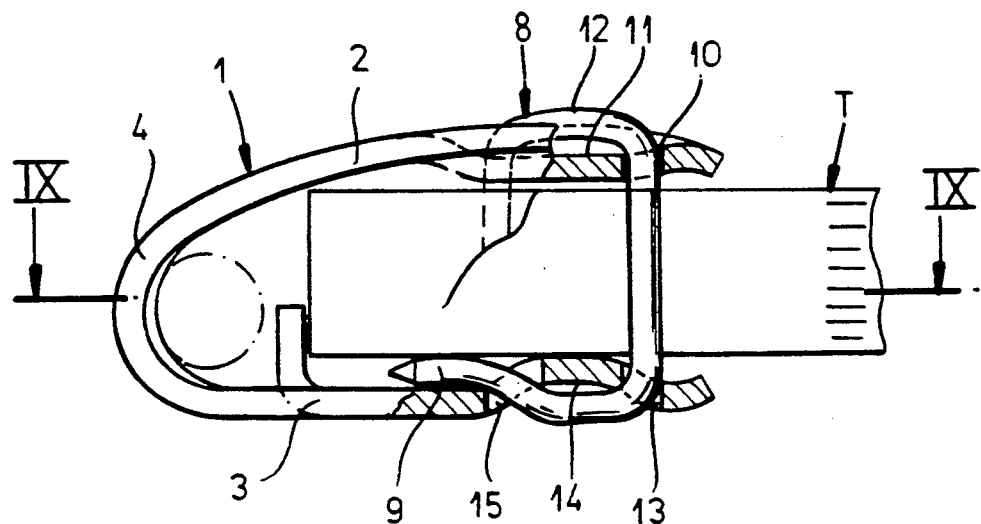
FIG. 8 is a cross-sectional view of a clip according to the invention after it has been secured to a piece of the conveyor belt.
Figure 10:
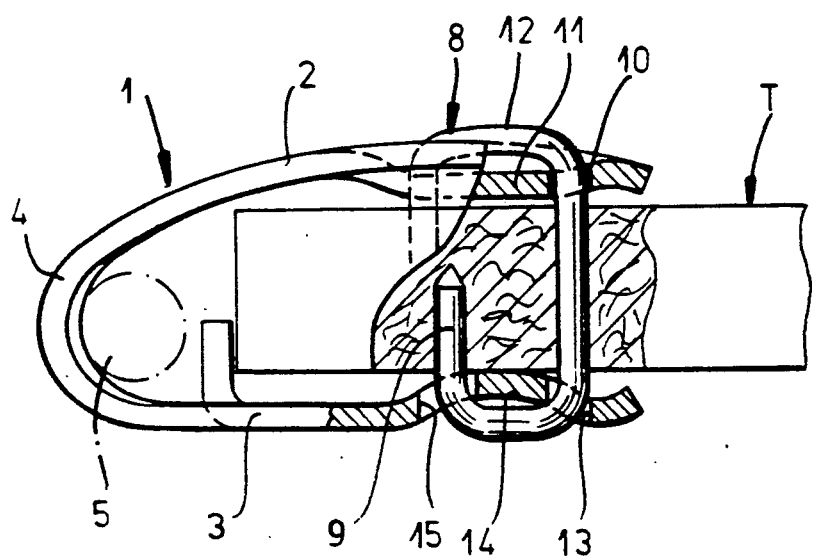
FIG. 10 is a view similar to FIG. 8 showing an embodiment in which a staple extends into the belt again at a free end of a tine thereof.

In accordance with an important feature of the invention, each aperture 13 is connected by way of a groove or channel 14 or the like to another aperture 15 constituting a re-entrant aperture. As will be described hereinafter, the second aperture 15 is adapted to receive the corresponding tine 9 of the respective staple 8 after such tine projects so far out of the aperture 13 as to be returned to the inside of the clip, as shown in FIGS. 8 and 10.

It is convenient to point out here that the grooves or channels or the like 14 extend at right angles to the position or axis X-Y of the connecting pin 5. Consequently, the apertures 13, 15, of the same pair are disposed on the same longitudinal line of the corresponding conveyor belt T.

Because of the locking resulting from the tines 9 of the staples 8 reentering the interior of the clips, the same can be secured in situ by means of a very simply constructed drifting device whose drift can be driven in manually with a hammer or similar tool to ensure that the staples 8 press tightly. Effective securing of the clips therefore does not require the application of high pressures.

FIGS. 4–7 show a drifting device specially devised for securing the clips according to the invention. The drifting device comprises a horizontal bar or rod 16 to support a row of clips 1 during the securing thereof. The bar or rod 16 can then be effective as an anvil for bending the staple tines. The device comprises, in combination with the bar 16, a moving tool 17 effective as a guide for a drift 18 for pressing in the staples. The drift 18 can be driven in manually with a hammer or similar tool.

A row of protuberances 19a alternating with protuberances 19b is disposed on the top surface of the bar 16, each protuberance being disposed opposite the place intended for a clip 1. The difference between the protuberances 19a and 19b is that the protuberances 19a have a projecting hook intended to engage between the hinge elements of a clip 1 having two hinge elements 4. This ensures that all the clips of the same row are positioned accurately on the bar 16.

The clips 1 are secured by a small metal rod 21 which is threaded into the corresponding hinge elements and into a corresponding aperture 22 in the hooks 20.

All the protuberances 19a, 19b are formed with vertical bores 23 which are open at the top and which are adapted to receive a respective locating finger 24 disposed below the projection of the moving tool 17. Introducing the finger into any of the bores 23 is a convenient way of locating the tool 17 and enabling its drift 18 to drive and tighten the two staples 8 of the corresponding clip 1.

The drift 18 is of trapezoidal cross section and can therefore simultaneously press in the two staples 8 of the same clip. The guide passage 25 in the tool 17 is therefore also of a similar trapezoidal cross section.

Below the place provided for each groove or channel 14 or the like in the outside surface of the bottom bowed part 3 of a clip, the top surface of the bar 16 is formed with a groove or channel 26 or the like which extends in the same direction as the groove or channel 14. As FIG. 7 shows, each of the grooves or channels is of curved cross section.

Figure 7:
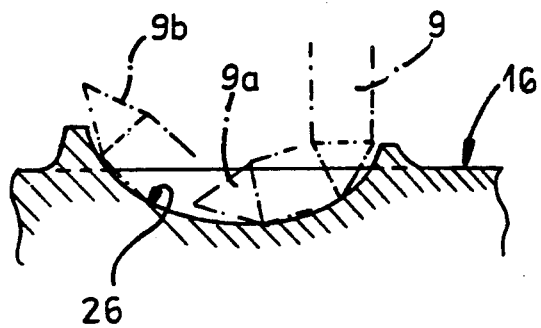
FIG. 7 is a view in cross section drawn to a larger scale of the anvil-forming bar or rod at the place where the same is formed with one of the guide grooves.

Consequently, when one of the tines 9 of a staple 8 emerges from one of the exit apertures 13 of the bottom bowed part 3 of the clips after passing through the belt T, such tine engages in one of the grooves or channels 26 in the bar 16, in the manner shown in FIG. 7. The tine 9 is therefore bent round into a curved shape 9a and is then raised to take on a shape 9b until engaging through the corresponding aperture 15 in the bowed part 3 of the clip. This tine is therefore to some extent compelled to return to the interior of the clip 1, so that its locking is ensured in situ (FIG. 8).

Depending upon the length of the arms of the particular staples 8 used, their tines can either simply be pressed through the belt T (FIG. 10) or introduced between the same and the corresponding bowed part 3 of the clips, as FIG. 8 shows. In both cases, however such an effective locking of the tines is provided that the same cannot be released by the forces to which the clips are exposed or exerted by them. The clips according to the invention can therefore be secured effectively by means of a very simple manual drifting device of the kind shown in FIGS. 4–7.

It must be borne in mind in this connection that the direction of the grooves or channels in the outside surface of the bottom bowed parts 3 of the clips enables the ends of each staple 8 to be disposed in accordance with the longitudinal lines of the conveyor belt, thus ensuring that these ends do not experience detaching forces when the belt runs over guide or driving rollers or drums or the like.

Another previously mentioned advantage of the clips, according to the invention, is that, because of the skewed arrangement of the entry apertures 10 and exit apertures 13, the bores through the belt and through the two bowed parts of a clip are not disposed on the same longitudinal line of the belt, thus ensuring that weakened longitudinal lines do not arise on the inside of the belt.

According to another advantageous feature of the clips according to the invention, the hinge elements 4 of the clips have a curved cross section whose convexity 27 is directed towards the inside of the particular clip concerned, as can be seen in FIG. 9. Consequently, the forces transmitted by the hinge elements 4, 4a of these clips to the connecting pins serve merely to produce waviness of this resilient pin after the two opposite rows of complementary clips 1, 1a have been coupled together. However, this phenomenon protects this pin from all contact with the sharp edges of the hinge elements 4, 4a and it is precisely for this reason that any risks of wearing and shearing due to the sharp edges are obviated.

The clips according to the invention are also called belt connectors and the staples are also called fastening cramps or catches or the like.

I claim:

1. A clip for connecting two parts of a belt, said clip comprising:

a U-shaped clip body straddling a portion of said belt and having bowed parts lying along opposite sides of said portion, said clip body being formed with a pivot element adapted to interdigitate with pivot elements of another clip on another belt portion so that said pivot elements are connectable by a pin traversing said pivot elements, one of said bowed parts being formed with a pair of entry apertures, the other of said bowed parts being formed with a pair of exit apertures respectively aligned with said entry apertures, a respective re-entrant aperture associated with each of said exit apertures and a respective groove connecting each of said exit apertures and the respective re-entrant aperture; and a staple driven through the portion of said belt straddled by said U-shaped clip body and having a pair of tines connected by a connecting part lying along said one of said bowed parts, said tines traversing said pair of entry apertures, said portion of said belt and said exit apertures, and being bent to lie in said grooves and pass inwardly through said re-entrant apertures to terminate between said bowed parts within said clip body.

2. The clip defined in claim 1 wherein said tines have free ends extending into said portion of said belt straddled by said U-shaped clip body.

3. The clip defined in claim 1 wherein said tines have free ends lying between said portion of said belt straddled by said U-shaped clip body and said other of said bowed parts.

4. The clip defined in claim 1 wherein said clip body is provided with another pair of entry apertures traversed by another said staple, a pair of exit apertures respectively aligned with the entry apertures of said other pair and traversed by tines of said other staple and a respective re-entrant aperture associated with each of the exit apertures traversed by a tine of the other staple and connected therewith a respective groove receiving the respective tine whereby said other staple has tines traversing said other pair of entry apertures, said portion of said belt, the exit apertures aligned with the entry apertures of the other pair and bent to lie in the grooves thereof and pass inwardly through the respective entrant apertures to terminate between said bowed parts, within said clip body.

5. The clip defined in claim 4 wherein said entry apertures in said one of said bowed parts for each of said stables are skewed so as not to be disposed along the same longitudinal line of said belt.

6. The clip defined in claim 5 wherein the pairs of entry apertures and the connecting parts of the respective staples form a V configuration with one another.

7. The clip defined in claim 6 wherein the entry apertures of each staple are connected by a respective groove receiving the connecting part of the respective staple.

8. The clip defined in claim 6 wherein the grooves connecting each exit aperture and the respective re-entrant aperture lie at right angles to said pin.

9. The clip defined in claim 1 wherein said pivot elements are convex toward said pin.

10. The device for setting a row of clips onto a portion of a conveyor belt whereby said clips can connect two parts of said belt and each of said clips comprises:
a U-shaped clip body straddling a portion of said belt and having bowed parts lying along opposite sides of said portion, said clip body being formed with a pivot element adapted to interdigitate with pivot elements of another clip on another belt portion so that said pivot elements are connectable by a pin traversing said pivot elements, one of said bowed parts being formed with a pair of entry apertures, the other of said bowed parts being formed with a pair of exit apertures respectively aligned with said entry apertures, a respective re-entrant aperture associated with each of said exit apertures and a respective groove connecting each of said exit apertures and the respective re-entrant aperture; and
a staple driven through the portion of said belt straddled by said U-shaped clip body and having a pair of tines connected by a connecting part lying along said one of said bowed parts, said tines traversing said pair of entry apertures, said portion of said belt and said exit apertures, and being bent to lie in said grooves and pass inwardly through said re-entrant apertures to terminate between said bowed parts within said clip body, said device comprising a support bar forming an anvil and provided at regular intervals with a plurality of protuberances formed as means for locating the clips to be secured to said portion and with respective seats, and a manual guiding tool comprising a staple-driven drift engageable in said seats, said anvil being formed with curved grooves receiving the tines of the respective staples for automatically bending said tines to engage in the respective re-entrant apertures for receiving said tines between the bowed parts of the respective clip body.

* * * * *